United States Patent
Tsugai

[11] Patent Number: 5,986,497
[45] Date of Patent: Nov. 16, 1999

[54] INTERFACE CIRCUIT FOR CAPACITIVE SENSOR

[75] Inventor: Masahiro Tsugai, Tokyo, Japan

[73] Assignee: Mitsubishi Denki Kabushiki Kaisha, Tokyo, Japan

[21] Appl. No.: 08/962,357

[22] Filed: Oct. 31, 1997

[30] Foreign Application Priority Data

May 22, 1997 [JP] Japan ................................. 9-148546
May 16, 1997 [JP] Japan ................................. 9-127424
Feb. 12, 1998 [JP] Japan ................................. 10-046257

[51] Int. Cl.$^6$ ........................................ G08C 19/10
[52] U.S. Cl. .......................... 327/554; 73/514.32; 327/94
[58] Field of Search ................................... 327/91, 93, 94, 327/95, 96, 390, 554, 516; 324/162, 661, 672, 678, 686, 679; 73/514.32, 724

[56] References Cited

U.S. PATENT DOCUMENTS

| | | | |
|---|---|---|---|
| 5,343,766 | 9/1994 | Lee | 73/862.61 |
| 5,451,940 | 9/1995 | Schneider et al. | 340/870.37 |
| 5,528,520 | 6/1996 | Kemp | 364/571.04 |
| 5,604,685 | 2/1997 | Seesink et al. | 364/573 |
| 5,633,594 | 5/1997 | Okada | 324/679 |
| 5,751,154 | 5/1998 | Tsugai | 324/661 |

OTHER PUBLICATIONS

"A ASIC for High–Resolution Capacitive Microaccelerometers", H. Leuthold et al, Sensors & Actuarores A21–23, 1990, pp. 278–281.

*Primary Examiner*—My-Trang Nu Ton
*Attorney, Agent, or Firm*—Sughrue, Mion, Zinn, Macpeak & Seas, PLLC

[57] ABSTRACT

An interface circuit for a capacitive sensor capable of outputting a detection signal with high stability and reliability while suppressing to a minimum the influence of offset and temperature dependency onto the output signal. In a differential capacitance type sensor having a common electrode connected to the ground potential, an electric discharge redistributing method and impedance conversion technique are adopted for obtaining an output voltage which is in proportion to the inter-electrode relative displacement. A switching mechanism is provided for mitigating an offset voltage component contained in the output due to an input offset voltage of the operational amplifier. Further, the sensitivity of the capacitive sensor is increased with the temperature-dependent drift of the sensor output being suppressed by providing additionally a power source change-over switches for allowing the voltages sampled in response to predetermined clocks to be differentially amplified.

6 Claims, 4 Drawing Sheets

SWITCH DRIVING CLOCK SIGNAL

INTERFACE CIRCUIT FOR CAPACITIVE SENSOR

BACKGROUND OF THE INVENTION

1. Field of the Invention

The present invention generally relates to a capacitance detecting circuit for detecting capacitance of a capacitive sensor which is employed for measuring pressure, acceleration, angular velocity or the like. More particularly, the invention is directed to an interface circuit connected to a capacitive sensor including first and second capacitors at least one of which has variable capacitance, wherein a common terminal of the first and second capacitors is connected to ground potential or a constant potential level.

2. Description of Related Art

A capacitive sensor for detecting a pressure of a fluid or acceleration and/or angular velocity of a moving object, can be manufactured by semiconductor micromachining techniques and can output an electric signal representing the fluid pressure, the acceleration, the angular velocity, etc. by detecting change or variation in the capacitance. The capacitive sensor as well as the capacitance detecting circuit therefor can provide advantages in that they can be manufactured in a miniaturized structure on a mass-production scale with high accuracy and enhanced reliability.

For having better understanding of the invention, description will be made in some detail of the technical background thereof by reference to FIG. 6 which shows in a sectional view a typical capacitive acceleration sensor which can be manufactured, for example, through a semiconductor micromachining process. Referring to the figure, the capacitive acceleration sensor includes an inertial mass member 1 supported on an anchor portion 2 by means of a cantilever 3, stationary electrodes 4 and 5 formed on a supporting member 6 so as to be positioned above and below the inertial mass member 1, respectively. The inertial mass member 1 and the stationary electrodes 4 and 5 cooperate to constitute capacitors 7 and 8, respectively, as shown in an equivalent circuit diagram of FIG. 7. The first and second capacitors 7 and 8 have respective capacitances C1 and C2 and constitute cooperatively a capacitive acceleration sensor device or element 9.

Operation of the capacitive acceleration sensor will be described. It is assumed that an inertial force due to acceleration acts on the inertial mass member 1 in the X-direction. Then, the inertial mass member 1 is caused to displace over a distance u in the X-direction in dependence on the magnitude of the acceleration. As a result of the displacement u of the inertial mass member 1, the capacitance between the inertial mass member 1 and the stationary electrode 5 increases (i.e., C+ΔC, where ΔC represents increment of the capacitance) while the capacitance between the inertial mass member 1 and the other stationary electrode 4 decreases (i.e., C−ΔC).

As a method of converting the change in the capacitance corresponding to the displacement of the inertial mass member 1 into a voltage signal, there may be mentioned, by way of example, a switched capacitor circuit technique disclosed in Rudlf et al's "A BASIC FOR HIGH-RESOLUTION CAPACITIVE MICROACCELEROMETERS, SENSOR & ACTUATOR", A21–A23 (1990), pp. 278–281.

FIG. 8 is a circuit diagram showing a conventional or hitherto known conversion circuit for converting change of capacitance of a capacitive sensor into an electric signal, and FIG. 9 is a timing chart for illustrating operation of switches incorporated in the circuit shown in FIG. 8

Referring to FIG. 8, a capacitive sensor element 9 is implemented in a structure similar to that shown in FIG. 7 and includes the first and second capacitors 7 and 8, wherein the junction or common terminal thereof (i.e., connection node between one ends of the capacitors 7 and 8) is connected to an inversion input terminal of a first stage operational amplifier A1 incorporated in an impedance conversion circuit 10, while the other end of the first capacitor 7 is coupled to a source voltage Vs by way of a switch SW1 and additionally connected to a non-inversion input terminal of the first stage operational amplifier A1 by way of a switch SW2. On the other hand, the other end of the second capacitor 8 is connected to the ground potential (Gnd) via a switch SW4 and additionally to a conductor or wire interconnecting the switch SW2 and the non-inversion input terminal of the first stage operational amplifier A1 by way of a switch SW3. The impedance conversion circuit 10 includes a second stage operational amplifier A2 in addition to the first stage operational amplifier A1, wherein the inversion input terminal of the first stage operational amplifier A1 is connected to the common terminal of the first and second capacitors 7 and 8. The output of the first stage operational amplifier A1 is fed back to the inversion input terminal of the first amplifier A1 via a feedback capacitor 11 across which a switch SW5 is connected in parallel. The non-inversion input terminal of the first stage operational amplifier A1 is connected to a reference voltage source Vr via a holding capacitor 14. The inversion input terminal of the second stage operational amplifier A2 is connected to the output terminal of the first stage operational amplifier A1 by way of a switch SW6 and a fourth capacitor 12, while the non-inversion input terminal of the second stage operational amplifier A2 is connected to the reference voltage Vr and additionally to the fourth capacitor 12 via a switch SW7 The output of the second stage operational amplifier A2 is fed back to the inversion input terminal thereof by way of a fifth capacitor 13 and additionally to the non-inversion input terminal of the first stage operational amplifier A1 via a switch SW8.

The switches SW1, SW4 and SW6 are closed in response to a first timing clock signal φ1 illustrated in FIG. 9, while the switches SW2, SW3, SW5, SW7 and SW8 are closed in response to a second clock timing signal φ2 also illustrated in FIG. 9.

When the switches SW1 and SW4 are closed or turned on in response to the first clock timing signal φ1, the source voltage Vs is applied to the one terminal of the first capacitor 7 constituting a part of the capacitive sensor element 9 by way of the closed switch SW1, and the other terminal of the second capacitor 8 is coupled to the ground potential by way of the closed switch SW4. At that time point, when the junction electrode (common terminal) of the first and second capacitors 7 and 8 is not connected to the inversion input terminal of the first stage operational amplifier A1, electric charge is stored in the first and second capacitors 7 and 8, respectively, in a quantity equal to each other as a result of which there makes appearance at the common terminal of the first and second capacitors 7 and 8 a voltage Vm which can be expressed as follows:

$$Vm = C1/(C1+C2) \cdot Vs \qquad (1)$$

$$= Vs/2 \cdot [1 + S]$$

where S represents a sensor sensitivity which can be expressed by $$S = (C1 - C2)/(C1 + C2)$$

For the convenience of discussion, it is assumed that the capacitances C1 and C2 can be expressed as follows:

$$C1 = Co/(1 - X)$$

$$C2 = Co/(1 + X)$$

where X represents a relative displacement relative to the initial distance between the inertial mass member 1 and the stationary electrodes 4 and 5 (hereinafter also referred to also as the inter-electrode relative displacement), respectively. Thus, the following relation applies valid.

$$S = X$$

In other words, the sensitivity S of the capacitive sensor element 9 corresponds to or depends on the inter-electrode relative displacement X.

In designing the interface circuit for the capacitive sensor or sensor element 9 it is preferred to extract the voltage signal given by the above-mentioned expression (1) with low impedance to thereby generate an output voltage representing proportionally the interelectrode relative displacement X. However, because the capacitive sensor element 9 is constituted by the capacitors having the capacitances ordinarily on the order of several pico-farads (pF) to several ten pico-farads (pF) and exhibits extremely high output impedance, impedance conversion is performed by using the succeeding impedance conversion circuit 10. Basically, the impedance conversion circuit 10 is so designed as to determine the non-inversion input voltage for the first stage operational amplifier A1 so that the electric charge can be stored in the first and second capacitors 7 and 8, respectively, in an equal quantity.

The conventional conversion circuit described above suffers drawback that the input offset voltage Vos1 of the first stage operational amplifier A1 makes appearance at the output terminal after having been amplified, as can be seen from the expression (2) mentioned below. The capacitance C3 of the third feedback capacitor 11 can not be decreased excessively in order to ensure the stability of the first stage operational amplifier A1. As the sum (C1+C2) of the capacitances C1 and C2 of the first and second capacitors 7 and 8 is selected smaller when compared with the capacitance C3 of the third capacitor 11, the offset voltage Vos1 appearing at the output is amplified by a factor corresponding to the ratio between the sum capacitance (C1+C2) and the capacitance C3.

$$Vout = \{C1/(C1+C2)\} \cdot Vs + \{C3/(C1+C2) - 1\} \cdot Vos1 \quad (2)$$

As a result of this, the temperature dependency of the input offset voltage Vos1 becomes more remarkable, incurring degradation of the temperature characteristic of the output of the sensor to a disadvantage.

Furthermore, in the case where the common terminal 3 of the differential capacitance type sensor element 9 is connected to the ground potential or a fixed potential level, as shown in FIG. 7, the circuit shown in FIG. 8 can not be used as it is, giving rise to a problem.

Besides, because the output of the sensor is amplified in a succeeding operational amplifier with a view enhancing the sensitivity of the sensor, the drift component ascribable to the temperature characteristic of the capacitive sensor element 9 is amplified, incurring noticeable noise in the sensor output signal and thus degrading the reliability of the sensor output signal.

Moreover, because the common terminal 3 of the capacitive sensor element 9 at which the voltage Vm given by the expression (1) makes appearance in dependence on the displacement of the inertial mass member 1 is in the floating state, difficulty will be encountered in the attempt for providing additionally an actuating electrode in opposition to the terminal 3 for thereby actuating the inertial mass member 1 by making use of an electrostatic force acting between the electrodes when a driving voltage Va is applied to the actuating electrode for the purpose of diagnosing the sensor operation. In that case, the effective interelectrode voltage is no more than a difference (Va−Vm) between the voltages Va and Vm. Consequently, sufficiently high actuating voltage can not be made use of, which in turn means that the result of the diagnosis is poor in the reliability, giving rise to a problem.

SUMMARY OF THE INVENTION

In the light of the state of the art described above, it is an object of the present invention to provide an interface circuit for a capacitive sensor in which the offset voltage component appearing at the output as well as the temperature dependency can be suppressed to a possible minimum, whereby high stability and reliability can be ensured.

For achieving the above and other objects which will become apparent as the description proceeds, it is contemplated with the present invention that for a differential capacitance type sensor having a common electrode connected to the ground potential, an electric discharge redistributing method and an impedance conversion technique are adopted for obtaining an output voltage which is in proportion to the inter-electrode relative displacement. Besides, a switching mechanism is provided for mitigating an offset voltage component contained in the output due to an input offset voltage of the operational amplifier. Further, the sensitivity of the capacitive sensor is increased with the temperature-dependent drift of the sensor output being suppressed by providing additionally a power source change-over switches for thereby allowing the voltages sampled in response to predetermined clocks to be differentially amplified.

Thus, there is provided according to a first aspect of the present invention an interface circuit connected to a capacitive sensor including a first capacitor and a second capacitor at least one of which exhibits a variable capacitance, wherein a common terminal of the first and second capacitors is connected to the ground potential or alternatively fixed at a constant potential level. The interface circuit mentioned above includes a first operational amplifier, a third feedback capacitor inserted between an output terminal and an inversion input terminal of the first operational amplifier, a fourth capacitor having one end connected to the output terminal of the first operational amplifier, a sixth holding capacitor inserted between a non-inversion input terminal of the first operational amplifier and a reference voltage source, a second operational amplifier having a non-inversion input terminal connected to the reference voltage source, a fifth feedback capacitor inserted between an output terminal and an inversion input terminal of the second operational amplifier, wherein in a first switching cycle, the first capacitor is electrically charged with a source voltage while the second capacitor and the third feedback capacitor are electrically discharged and the other end of the fourth capacitor is connected to the reference voltage source with the output terminal of the second operational amplifier being connected to the non-inversion input terminal of the first operational amplifier. At an inversion timing of the first switching cycle, the first and second capacitors are short-circuited to be connected to the inversion input terminal of the first operational amplifier with the other end of the fourth capacitor being connected to the inversion input terminal of the second operational amplifier.

Furthermore, according to a second aspect, there is provided an interface circuit connected to a capacitive sensor including a first capacitor and a second capacitor at least one of which exhibits a variable capacitance, wherein a common terminal of the first and second capacitors is connected to the ground potential or alternatively fixed at a constant potential level. The interface circuit described above includes a first operational amplifier, a third feedback capacitor having one end connected to an output terminal of the first operational amplifier, a fourth capacitor having one end connected to the output terminal of the first operational amplifier, a sixth holding capacitor inserted between a non-inversion input terminal of the first operational amplifier and a reference voltage source, a second operational amplifier having a non-inversion input terminal connected to the reference voltage source, a fifth feedback capacitor inserted between an output terminal and an inversion input terminal of the second operational amplifier, wherein in a first switching cycle, the first capacitor is electrically charged with a source voltage while the second capacitor and the third feedback capacitor are electrically discharged. Further, the other end of the third feedback capacitor is connected to the non-inversion input terminal of the first operational amplifier with the other end of the fourth capacitor being connected to the reference voltage source and additionally the output terminal of the second operational amplifier is connected to the non-inversion input terminal of the first operational amplifier. On the other hand, at an inversion timing of the first switching cycle, the first capacitor and the second capacitor are short-circuited to be connected to the inversion input terminal of the first operational amplifier with the other end of the third feedback capacitor being connected to the inversion input terminal of the first operational amplifier and additionally the other end of the fourth capacitor is connected to the inversion input terminal of the second operational amplifier.

In a preferred mode for carrying out the invention, the interface circuit described above may further include a means for reversing connections to the voltage source in a second switching cycle having a longer period than that of the first switching cycle, first and second sample-and-hold circuits for sampling and holding voltages outputted from the voltages sources with inverted polarities, and a differential amplifier for differentially amplifying two voltage signals held by the first and second sample-and-hold circuits, respectively.

In another preferred mode for carrying out the invention, the interface circuit described above may be so arranged as to include additionally an actuating electrode provided as a stationary electrode in association with at least any one of stationary electrodes constituting parts of the first capacitor and the second capacitor, respectively.

With the structures of the interface circuit for the capacitive sensor, there can be obtained advantages mentioned below.

The interface circuit for the capacitive sensor can be used even in such application where the common terminal of the sensor element has to be connected to the ground potential. Further, because the influence of change or variation in the input offset voltage of the operational amplifier incorporated in the impedance conversion circuit can be compensated for, it is possible to realize the detection circuit in which the DC offset output voltage scarcely exhibit temperature dependency. Additionally, since the DC offset temperature-dependent component undergoes substantially no amplification nevertheless of increasing of the sensitivity, the SN-ratio of the sensor can be improved significantly without being accompanied with amplification of noise component. Additionally, by making use of the actuating electrode, it is possible to realize improved self-diagnosis capability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
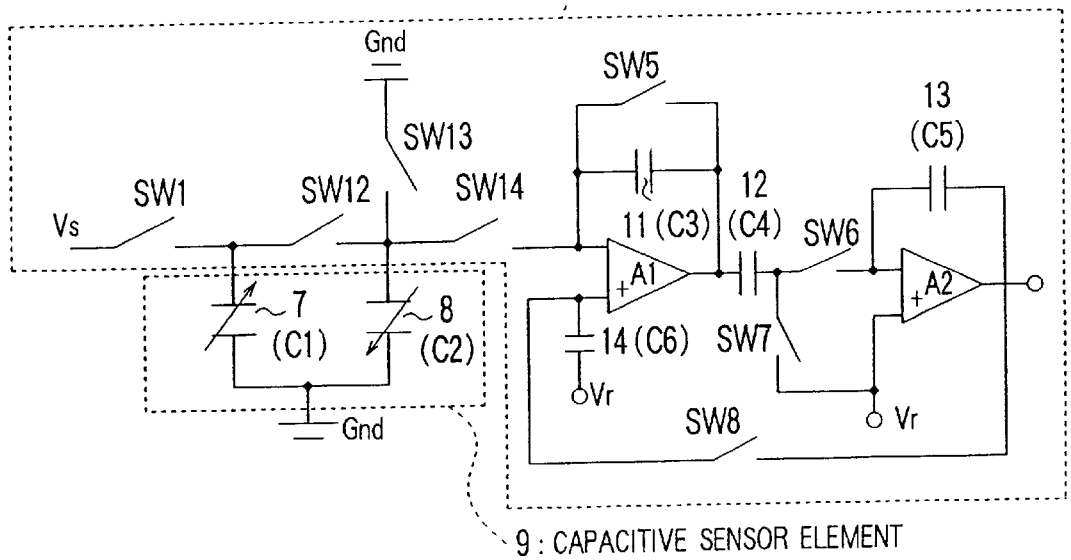
FIG. 1 is a circuit diagram showing an arrangement of an interface circuit for a capacitive sensor according to a first embodiment of the present invention.

Now, the present invention will be described in detail in conjunction with what is presently considered as preferred or typical embodiments by reference to the drawings. In the following description, like reference characters designate like or corresponding parts throughout the several views.

Embodiment 1

An interface circuit for a capacitive sensor according to a first embodiment of the present invention will be described by reference to FIG. 1 which is a circuit diagram showing an arrangement of the interface circuit for the capacitive sensor according to the instant embodiment of the invention.

Figure 7:
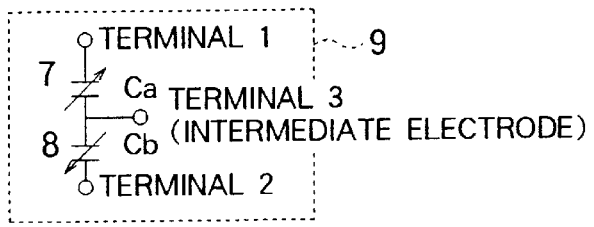
FIG. 7 is an equivalent circuit of the conventional sensor shown in FIG. 6.

The instant embodiment of the invention is directed to an impedance conversion circuit 21 for obtaining or deriving an output voltage represented by the expression (2) in the case where a common terminal (terminal 3) of the capacitive sensor element 9 shown in FIG. 7 is connected to the ground potential.

Referring to FIG. 1, one ends of the first and second capacitors 7 and 8 which are implemented as variable capacitors, respectively, are connected together to be coupled to the ground potential, while the other ends thereof are connected to each other via a switch SW12. Furthermore, the other end of the first capacitor 7 is connected to a source voltage Vs (supplied from a power source not shown) by way of a switch SW11. On the other hand, the other end of the second capacitor 8 is connected to the ground potential via a switch SW13 and additionally to a non-inversion input terminal of a first stage operational amplifier A1 of the impedance conversion circuit 21 by way of a switch SW14. The structure of the impedance conversion circuit 21 is substantially same as that of the impedance conversion circuit 10 described hereinbefore except for the above-mentioned structure and thus repeated description thereof will be unnecessary.

Figure 9:
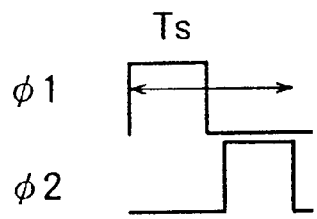
FIG. 9 is a timing chart for illustrating clock signals for driving switches incorporated in the circuit shown in FIG. 8.

The switches SW11, SW13, SW5, SW7 and SW8 are turned on and off in response to leading and trailing edges, respectively, of the first clock signal φ1 shown in FIG. 9, while the switches SW12, SW14 and SW6 are turned on and off in response to leading and trailing edges, respectively, of the second clock signal φ2 also shown in FIG. 9.

Referring to FIG. 1, in response to the first clock signal φ1, the first capacitor 7 of the capacitive sensor element 9 is electrically charged from the source voltage Vs with the other or second capacitor 8 being connected to the ground to be thereby electrically discharged.

Figure 8:
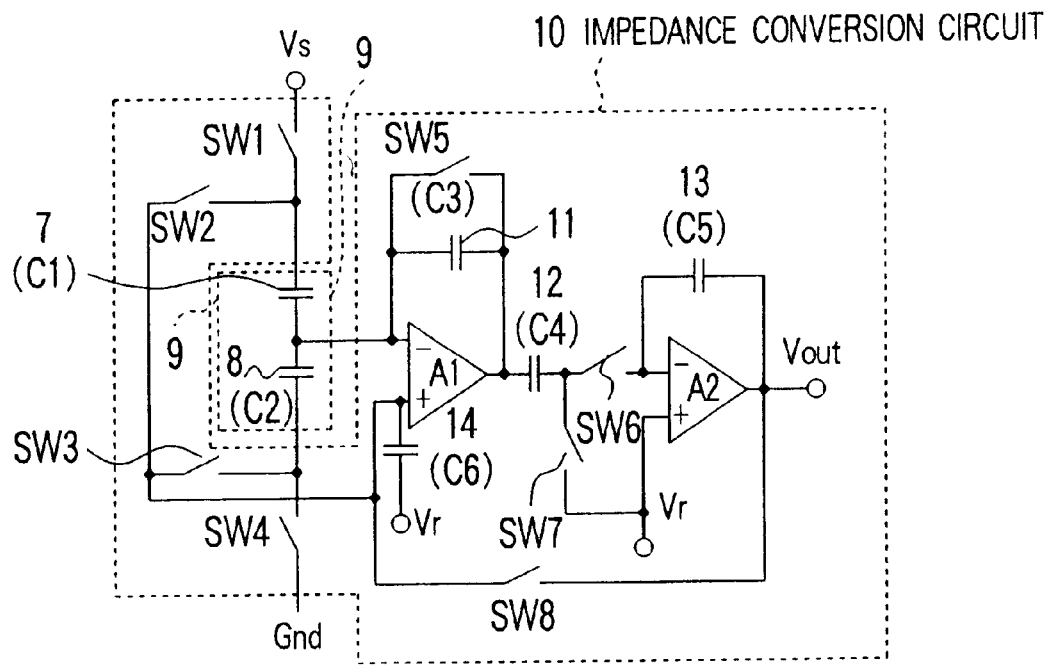
FIG. 8 is a circuit diagram showing, by way of example, a conventional interface circuit for a capacitive sensor.

When the switch SW12 is turned on in response to the second clock signal φ2 to thereby allow the electric charge stored in the first capacitor 7 to be transferred to the second capacitor 8, the potentials at both the first and second capacitors 7 and 8 assumes the voltage level corresponding to that given by the expression (2) due to the redistribution of the electric charge. Thus, it is possible to obtain the output voltage which is in proportion to the inter-electrode relative displacement X mentioned hereinbefore. The first stage operational amplifier A1 of the succeeding impedance conversion circuit 21 serves for the function to adjust the potential of the sixth capacitor 14 (having a capacitance C6) so as to derive the voltage Vm mentioned above. Except for this arrangements, the impedance conversion circuit 21 is essentially similar to the impedance conversion circuit 10 shown in FIG. 8. Although it has been described above that the first capacitor 7 is electrically charged with the second capacitor 8 being discharged in response to the first clock signal φ1, it should be understood that such arrangement can be equally adopted in which the second capacitor 8 is electrically charged with the first capacitor 7 being discharged, substantially to the same effect.

The teaching of the invention incarnated in the instant embodiment thereof can find application to the arrangement shown in FIG. 7 by connecting the cantilever 3 of the capacitive sensor element 9 to the ground potential or the capacitive sensor in which a plurality of the differential capacitance type sensor elements are employed or the capacitive sensor in which sensor elements are in a full bridge form, as described below in conjunction with a second embodiment of the invention.

Embodiment 2

Figure 2:
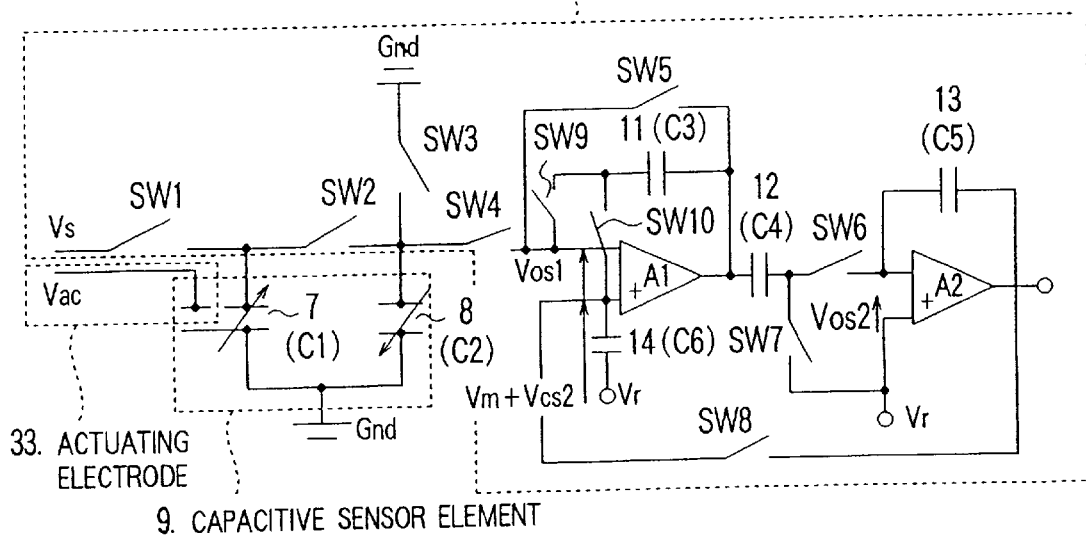
FIG. 2 is a circuit diagram showing an arrangement of a capacitive sensor and an interface circuit according to a second embodiment of the present invention.

FIG. 2 is a circuit diagram showing an arrangement of the capacitive sensor and the interface circuit according to the second embodiment of the present invention. With the arrangement according to the first embodiment of the invention, the common terminal 3 of the capacitive sensor element 9 can be connected to the ground potential. This circuit arrangement however suffers shortcoming that the offset voltage Vos1 of the first stage operational amplifier A1 is also amplified and outputted, as can be seen from the expression (2), whereby the temperature characteristic of the sensor is degraded more or less.

In the case of the interface circuit for the capacitive sensor according to the second embodiment of the invention, two switches SW9 and SW10 are additionally employed in an impedance conversion circuit 31, as is shown in FIG. 2. More specifically, one end of the third feedback capacitor 11 (having capacitance C3) is connected to the inversion input terminal of the first stage operational amplifier A1 via the switch SW9 and additionally connected to the non-inversion input terminal of the first stage operational amplifier A1 by way of the switch SW10. Owing to this arrangement, there can be generated the output voltage Vout which is given by the following expression (2):

$$Vout=\{C1/(C1+C2)\}\cdot Vs+\{C3/(C1+C2)\}\cdot(Vos2-Vos1)-Vos1 \qquad (3)$$

As can be seen from the above expression (3), the difference (Vos2−Vos1) between the input offset voltage of the first stage operational amplifier A1 and the second stage operational amplifier A2 is also amplified to be outputted as a part of the output voltage Vout.

In this conjunction, it is however noted that in the case of the operational amplifier manufactured through the semiconductor IC process, the input offsets Vos1 and Vos2 can be set to be substantially equal to each other. This means that the second term of the expression (3) can be canceled out, whereby the offset components can be prevented from being contained in the output voltage Vout.

In the capacitive sensor shown in FIG. 2, an actuating electrode 33 is additionally provided. By applying the voltage Va to the actuating electrode 33, it is possible to actuate the inertial mass member 1 connected to the ground potential under the electrostatic attraction. In this conjunction, it should be noted that the voltage Va itself can be effectively utilized for generating the electrostatic force or attraction between both the electrodes, differing from the conventional capacitive sensor. Consequently, displacement of the inertial mass member 1 upon actuation thereof and thus the sensitivity of the capacitive sensor can be increased, to an advantage.

Embodiment 3

Figure 3:
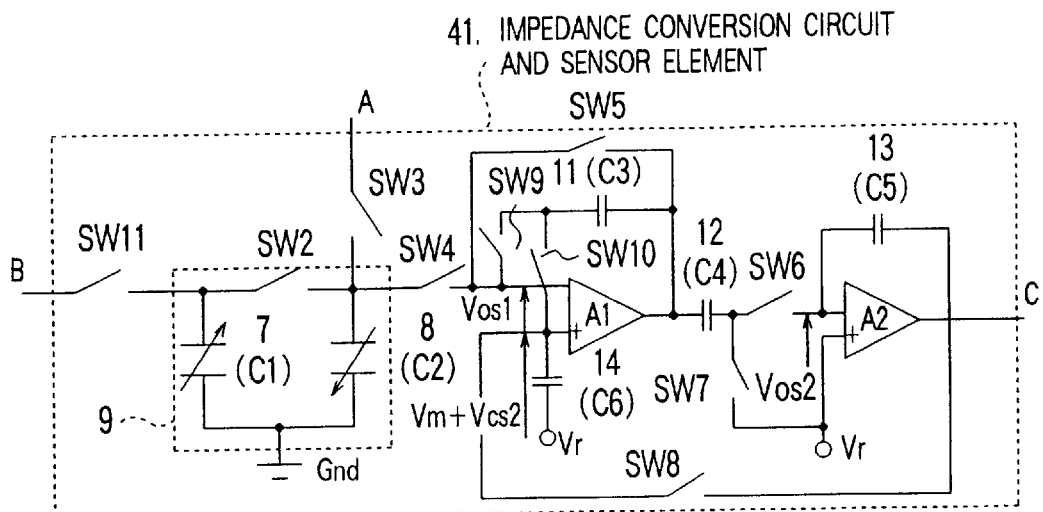
FIG. 3 is a view showing an interface circuit for a capacitive sensor according to a third embodiment of the present invention.
Figure 4:
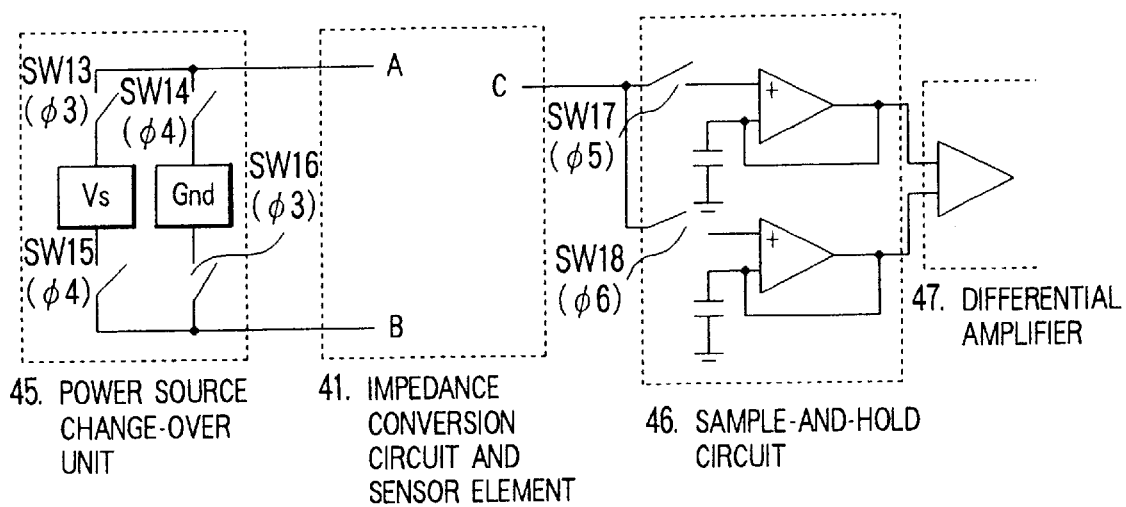
FIG. 4 is a circuit diagram showing an interface circuit for a capacitive sensor together with peripheral circuits according to the third embodiment of the present invention.
Figure 5:
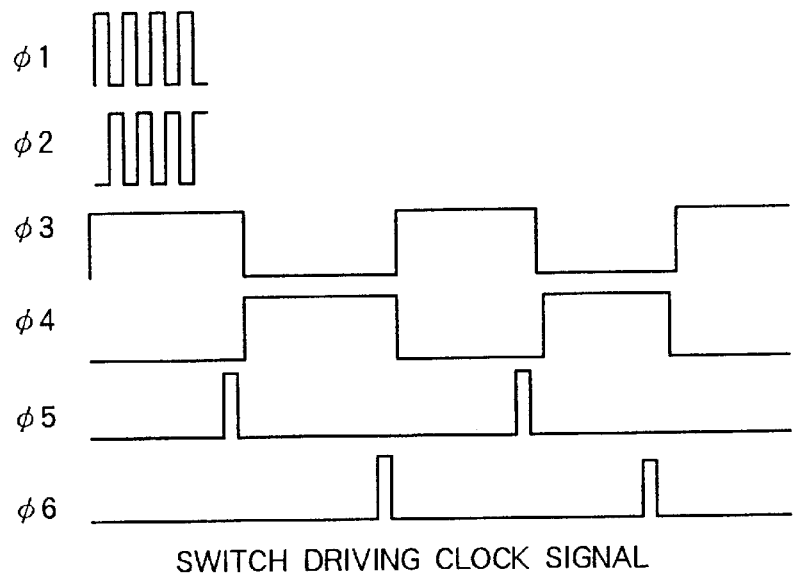
FIG. 5 is a timing chart illustrating clock signals for driving switches incorporated in the interface circuit according to the third embodiment of the invention.

FIGS. 3, 4 and 5 show an interface circuit 41 for a capacitive sensor according to a third embodiment of the present invention.

The arrangement of the interface circuit 41 shown in FIG. 3 is basically identical with the same shown in FIG. 2 in respect to the circuit arrangements of the impedance conversion circuit 31 and the capacitive sensor element 9. More specifically, the interface circuit 41 includes the impedance conversion circuit and the capacitive sensor element 9 and is provided with three terminals A, B and C, respectively, which are connected to a power supply switch 45 and a sample-and-hold circuit 46, wherein the sample-and-hold circuit 46 is connected to a differential amplifier 47. Switch SW13 to SW18 operate in response to clock signals φ3 to φ6, respectively.

The direction of the current supplied to the capacitive sensor element 9 is controlled by means of the switches SW13 to SW16 in response to the clock signals φ3 and φ4 each having a longer period than the clock signals φ1 and φ2. When the switches SW13 and SW16 are turned on (i.e., closed), the output-voltage generated immediately before by the sample-and-hold circuit 46 converges to a level Vma, as in the case of the arrangement shown in FIG. 6. The voltage Vma can be expressed as follows:

$$Vma = \{C1/(C1+C2)\}Vs$$

The above-mentioned voltage is sampled and held upon operation of the switch SW17 at a time point corresponding to the clock signal φ5. On the other hand, when the switches SW14 and SW15 are turned on, the output voltage generated immediately before by the sample-and-hold circuit 46 converges to a level Vmb which can be expressed as follows:

$$Vmb = \{C2/(C1+C2)\}Vs$$

The above-mentioned voltage is similarly sampled and held upon operation of the switch SW18 at a time point corresponding to the clock signal φ6. Difference between the voltages Vma and Vmb is determined by the succeeding differential amplifier 47. Consequently, the voltage Vm is given by the following expression (4):

$$Vm = \{(C1-C2)/(C1+C2)\}Vs \quad (4)$$
$$= SVs$$

As can be seen from the comparison of the expression (3) with the expression (4), the arrangement according to the instant embodiment of the invention allows the sensitivity to be increased significantly. Parenthetically, control of the sensitivity of the sensor is usually realized by adjusting the gain of the succeeding operational amplifier. In this conjunction, it is noted that in case the circuit including the succeeding operational amplifier has DC offset dependency and/or noise susceptibility, the output of the circuit will contain noise component of magnitude multiplied with the gain of the operational amplifier. However, in the circuit arrangement according to the instant embodiment of the invention, the gain of the succeeding circuit including the operational amplifier can be reduced by a half by increasing the sensitivity of the capacitive sensor element 9, as a result of which the SN ratio of the sensor can be increased e.g. twice.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the exemplary embodiments of the invention have been described on the assumption that the first and second capacitors 7 and 8 of the capacitive sensor element 9 are variable capacitors, it can readily be appreciated that one of these two capacitors may be implemented as the variable capacitor with the other being constituted by a capacitor having a fixed capacitance.

Figure 6:
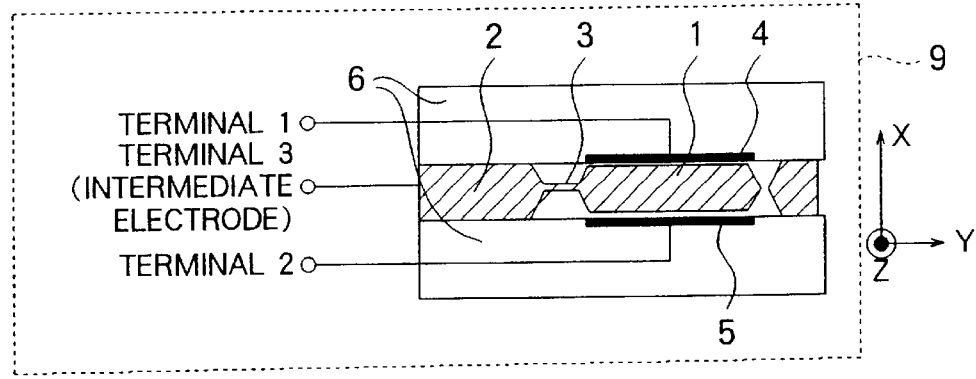
FIG. 6 is a circuit diagram showing, by way of example, a conventional capacitive acceleration sensor.

Further, it goes without saying that the invention is never restricted to the application to the capacitive acceleration sensor shown in FIG. 6 but can find application to other types of capacitive sensors.

Accordingly, all suitable modifications and equivalents may be resorted to, falling within the spirit and scope of the invention.

What is claimed is:

1. A capacitance detecting circuit comprising:
   a capacitive sensor comprising:
      a first capacitor; and
      a second capacitor, wherein at least one of said first and second capacitors exhibits a variable capacitance, and wherein a common terminal of said first and second capacitors is connected to ground potential or a constant potential level; and
   an interface circuit comprising:
      a first operational amplifier;
      a third feedback capacitor connected between an output terminal and an inversion input terminal of said first operational amplifier;
      a fourth capacitor having a first end connected to the output terminal of said first operational amplifier;
      a second operational amplifier having a non-inversion input terminal connected to a reference voltage source;
      a fifth feedback capacitor connected between an output terminal and an inversion input terminal of said second operational amplifier;
      a sixth holding capacitor connected between a non-inversion input terminal of said first operational amplifier and said reference voltage source;
   wherein in a first switching cycle, said first capacitor is electrically charged with a source voltage, said second capacitor and said third feedback capacitor are electrically discharged, a second end of said fourth capacitor is connected to said reference voltage source, and an output terminal of said second operational amplifier is connected to the non-inversion input terminal of said first operational amplifier, and
   wherein at an inversion timing of said first switching cycle, said first capacitor and said second capacitor are short-circuited to be connected to the inversion input terminal of said first operational amplifier and the second end of said fourth capacitor is connected to an inversion input terminal of said second operational amplifier.

2. A capacitance detecting circuit according to claim 1, wherein said interface circuit further comprises:
   means for reversing connections to the reference voltage source in a second switching cycle having a longer period than that of said first switching cycle;
   first and second sample-and-hold circuits for sampling and holding output from said second operational amplifier with inverted polarities; and
   a differential amplifier for differentially amplifying two voltage signals held by said first and second sample-and-hold circuits, respectively.

3. A capacitance detecting circuit according to claim 1, wherein said interface circuit further comprises:
   an actuating electrode provided as a stationary electrode in association with at least any one of stationary electrodes constituting parts of said first capacitor and said second capacitor, respectively.

4. A capacitance detecting circuit comprising:
   a capacitive sensor comprising:
      first capacitor; and
      a second capacitor, wherein at least one of said first and second capacitors has a variable capacitance, and wherein a common terminal of said first and second capacitors is connected to ground potential or a constant potential level, and
   an interface circuit comprising:

a first operational amplifier;

a third feedback-capacitor having a first end connected to an output terminal of said first operational amplifier;

a fourth capacitor having one end connected to the output terminal of said first operational amplifier;

a second operational amplifier having a non-inversion input terminal connected to a reference voltage source;

a fifth feedback capacitor connected between an output terminal and an inversion input terminal of said second operational amplifier;

a sixth holding capacitor connected between a non-inversion input terminal of said first operational amplifier and said reference voltage source;

wherein in a first switching cycle, said first capacitor is electrically charged with a source voltage, said second capacitor and said third feedback capacitor are electrically discharged, a second end of said third feedback capacitor is connected to the non-inversion input terminal of said first operational amplifier, a second end of said fourth capacitor is connected to said reference voltage source and an output terminal of said second operational amplifier is connected to a non-inversion input terminal of said first operational amplifier, and wherein at an inversion timing of said first switching cycle, said first capacitor and said second capacitor are short-circuited to be connected to the inversion input terminal of said first operational amplifier, the second end of said third feedback capacitor is connected to the inversion input terminal of said first operational amplifier, and the second end of said fourth capacitor is connected to the inversion input terminal of said second operational amplifier.

5. A capacitance detecting circuit according to claim 4, wherein said interface circuit further comprises:

means for reversing connections to the reference voltage source in a second switching cycle having a longer period than that of said first switching cycle;

first and second sample-and-hold circuits for sampling and holding voltages output from said second operational amplifier with inverted polarities; and a differential amplifier for differentially amplifying two voltage signals held by said first and second sample-and-hold circuits, respectively.

6. A capacitance detecting circuit according to claim 4, wherein said interface circuit further comprises:

an actuating electrode provided as a stationary electrode in association with at least any one of stationary electrodes constituting parts of said first capacitor and said second capacitor, respectively.

* * * * *